(12) United States Patent
Lee

(10) Patent No.: US 11,330,928 B2
(45) Date of Patent: *May 17, 2022

(54) MANUFACTURING METHOD FOR SOUP POT WITH PARTIAL CONCAVE-CONVEX PATTERNS ON OUTER SURFACE THEREOF

(71) Applicant: JIANGMAN YISHAN METAL PRODUCTS CO., LTD., Guangdong (CN)

(72) Inventor: Changho Lee, Guangdong (CN)

(73) Assignee: JIANGMEN YISHAN METAL PRODUCTS CO., LTD., Jiangmen (CN)

( * ) Notice: Subject to any disclaimer, the term of this patent is extended or adjusted under 35 U.S.C. 154(b) by 127 days.

This patent is subject to a terminal disclaimer.

(21) Appl. No.: 16/650,345

(22) PCT Filed: Oct. 24, 2018

(86) PCT No.: PCT/CN2018/111572
§ 371 (c)(1),
(2) Date: Mar. 24, 2020

(87) PCT Pub. No.: WO2020/077656
PCT Pub. Date: Apr. 23, 2020

(65) Prior Publication Data
US 2021/0307551 A1    Oct. 7, 2021

(30) Foreign Application Priority Data
Oct. 19, 2018 (CN) .......................... 201811219251.3

(51) Int. Cl.
*A47J 27/00* (2006.01)
*B44C 1/22* (2006.01)
(Continued)

(52) U.S. Cl.
CPC .......... *A47J 27/002* (2013.01); *A47J 36/025* (2013.01); *B21D 51/22* (2013.01); *B24B 1/00* (2013.01);
(Continued)

(58) Field of Classification Search
None
See application file for complete search history.

(56) References Cited

U.S. PATENT DOCUMENTS

| 4,677,000 A * | 6/1987 | Gardaz ................. A47J 36/025 427/261 |
| 7,488,515 B2 * | 2/2009 | Groll ..................... A47J 27/002 427/294 |
| 2003/0021988 A1 * | 1/2003 | Tannenbaum ........ A47J 36/025 428/336 |

(Continued)

FOREIGN PATENT DOCUMENTS

| CN | 2123255 U | 12/1992 |
| CN | 202154516 U | 3/2012 |

(Continued)

*Primary Examiner* — Shamim Ahmed
(74) *Attorney, Agent, or Firm* — Weitzman Law Offices, LLC

(57) ABSTRACT

The invention discloses a manufacturing method for a soup pot with partial concave-convex patterns on an outer surface thereof. The method comprises: preparing a plane blank for forming a pot body; screen-printing a layer of ink with preset patterns on a surface of the blank of the pot body; screen-printing a layer of ink with preset patterns on a bottom surface of the blank of the pot body; etching at positions where no patterns occurs on the surface of the blank of the pot body; stretching the blank of the pot body to form a soup pot, and flashing the edge of the pot body; and spraying a nonstick pan coating on the blank of the pot body, and polishing with abrasive paper at positions where the convex patterns occur and where no pattern occurs.

5 Claims, 2 Drawing Sheets

(51) Int. Cl.
  *A47J 36/02* (2006.01)
  *B21D 51/22* (2006.01)
  *C23F 4/04* (2006.01)
  *C23C 4/02* (2006.01)
  *B41M 1/12* (2006.01)
  *C23F 1/02* (2006.01)
  *B24B 1/00* (2006.01)

(52) U.S. Cl.
  CPC ................ *B41M 1/12* (2013.01); *B44C 1/227* (2013.01); *C23C 4/02* (2013.01); *C23F 1/02* (2013.01); *C23F 4/04* (2013.01)

(56) References Cited

U.S. PATENT DOCUMENTS

2008/0083747 A1*  4/2008  Park .................. A47J 27/022
                                                219/621
2017/0190927 A1*  7/2017  Mao .................... B05D 7/14

FOREIGN PATENT DOCUMENTS

| CN | 103142132 A | 6/2013 |
| CN | 103844877 A | 6/2014 |
| CN | 104382481 A | 3/2015 |
| CN | 204192324 U | 3/2015 |
| CN | 103142132 B | 5/2015 |
| CN | 204427600 U | 7/2015 |
| CN | 204654589 U | 9/2015 |
| CN | 105506630 A | 10/2017 |
| KR | 20160134150 A | 11/2016 |
| WO | 9101106 A1 | 2/1991 |

* cited by examiner

MANUFACTURING METHOD FOR SOUP POT WITH PARTIAL CONCAVE-CONVEX PATTERNS ON OUTER SURFACE THEREOF

TECHNICAL FIELD

The present invention relates to a manufacturing method for cooking utensils, and more particularly, to a manufacturing method for a soup pot with concave-convex patterns.

BACKGROUND

At present, a stainless steel pot available on the market generally has a polished smooth outer surface, which can be very aesthetic when the pot is newly bought. However, after a long period of use, the outer surface of the pot body will be scratched, stained, blackened, etc., and food debris will firmly adhere to the outer surface of the pot body, causing difficulties in cleaning. Moreover, the existing stainless steel pots either have a thick pot body, slow heat transfer, long cooking time and large fuel consumption, or have a thinner pot body, low pot body strength, and a short service life.

Therefore, a soup pot having a pot body with concave-convex patterns on inner and outer surfaces thereof is now introduced into the market. The design allows an increased heat absorption area and quicker heat transfer for the soup pot. Moreover, the patterns on the outer surface of the soup pot are in contact with a stove, playing a role of skid resistance and scratch prevention, as well as achieving a purpose of facilitating cleaning.

At present, some customers want a soup pot with an outer surface having a concave and convex patterned lower part and a polished smooth upper part, which can provide a better decorative effect. However, when a plane blank with corroded concave and convex patterns is deeply stretched to form the soup pot, since the blank has a thickness at the positions where the concave and convex patterns occur different from that at the positions where no concave and convex pattern occurs, breakage usually occurs on a junction of the parts of different thicknesses during deep stretching, resulting in a very low yield.

SUMMARY

In order to overcome the defects of the manufacturing method described above, the present invention aims to provide a manufacturing method for a soup pot with partial concave-convex patterns on an outer surface thereof, with a simple process and lower costs.

The technical solutions used in the disclosure to solve the technical problems above are as follows.

A manufacturing method for a soup pot with partial concave-convex patterns on an outer surface thereof comprises:

step S1: making a plane blank for forming a pot body;

step S2: screen-printing a layer of ink with preset patterns on a surface of the plane blank of the pot body, and drying and curing the ink;

step S3: screen-printing a layer of ink with preset patterns on a bottom surface of the plane blank of the pot body, wherein at positions where no pattern occurs the bottom surface is not covered, and then drying and curing the ink;

step S4: etching at positions where no patterns occur on the top surface and the bottom surface of the plane blank of the pot body, and then cleaning the ink and drying;

step S5: stretching the plane blank of the pot body to form a soup pot, and flashing the edge of the pot body; and step S6: spraying a nonstick pan coating on the top surface of the plane blank of the pot body, and polishing with abrasive paper at positions where the convex patterns occur and where no pattern occurs, the convex patterns are formed by etching on the top surface the plane blank, so that, at the positions where the convex patterns occur and where no pattern occurs, no non-stick pan coating occurs.

The present invention has the beneficial effects that: according to the present invention, the pot body at the positions where no patterns occurs is also etched to ensure a uniform overall thickness of the plane blank of the pot body, effectively preventing the spot body from fractures at the border between the positions where the concave-convex patterns occur and the positions where no concave-convex pattern occurs, when the plane blank of the pot body is deeply stamped and stretched, and ensuring a yield of products. Therefore, a finished product according the invention can have the surface with the concave-convex patterned lower part and the polished smooth upper part, for a better decorative effect.

BRIEF DESCRIPTION OF THE DRAWINGS

The present invention is further described hereinafter by embodiments, with reference to the drawings, wherein.

DETAILED DESCRIPTION

The technical solutions of the present invention are further described by following specific embodiments.

A manufacturing method for a soup pot with partial concave-convex patterns on an outer surface thereof according to the disclosure comprises the following steps.

Step S1: making a plane blank for forming a pot body.

In step S1, a three-layer steel composite plane blank is selected, its outer and inner layers are stainless steel, while its middle layer is formed by compounding aluminum alloy. Since the aluminum alloy of the middle layer has quick heat conduction and can be evenly heated, the heat is evenly transferred to the stainless steel of the inner layer. Consequently, food in a soup pot made of the plane blank can be heated evenly during cooking, and thus a smokeless effect is achieved.

Step S2: screen printing a layer of ink with preset patterns on a surface of the plane blank of the pot body, and drying and curing the ink.

Step S3: screen printing a layer of ink with preset patterns on a bottom surface of the plane blank of the pot body, wherein the plane blank at any position where no pattern occurs is not covered, and then drying and curing the ink.

The preset patterns are polygonal patterns evenly distributed in matrixes, such as square patterns, hexagonal patterns, and other honeycomb patterns.

Step S4: etching at positions where no patterns occur on the top surface and the bottom surface of the plane blank of the pot body, and then cleaning the ink and drying.

Step S5: stretching the plane blank of the pot body to form a soup pot, and flashing the edge of the pot body.

Step S6: spraying a nonstick pan coating on the top surface of the plane blank of the pot body, and polishing with abrasive paper at positions where the convex patterns occur and where no pattern occurs, the convex patterns are formed by etching on the top surface the plane blank, so that, at the positions where the convex patterns occur and where no pattern occurs, no non-stick pan coating occurs.

Figure 1:
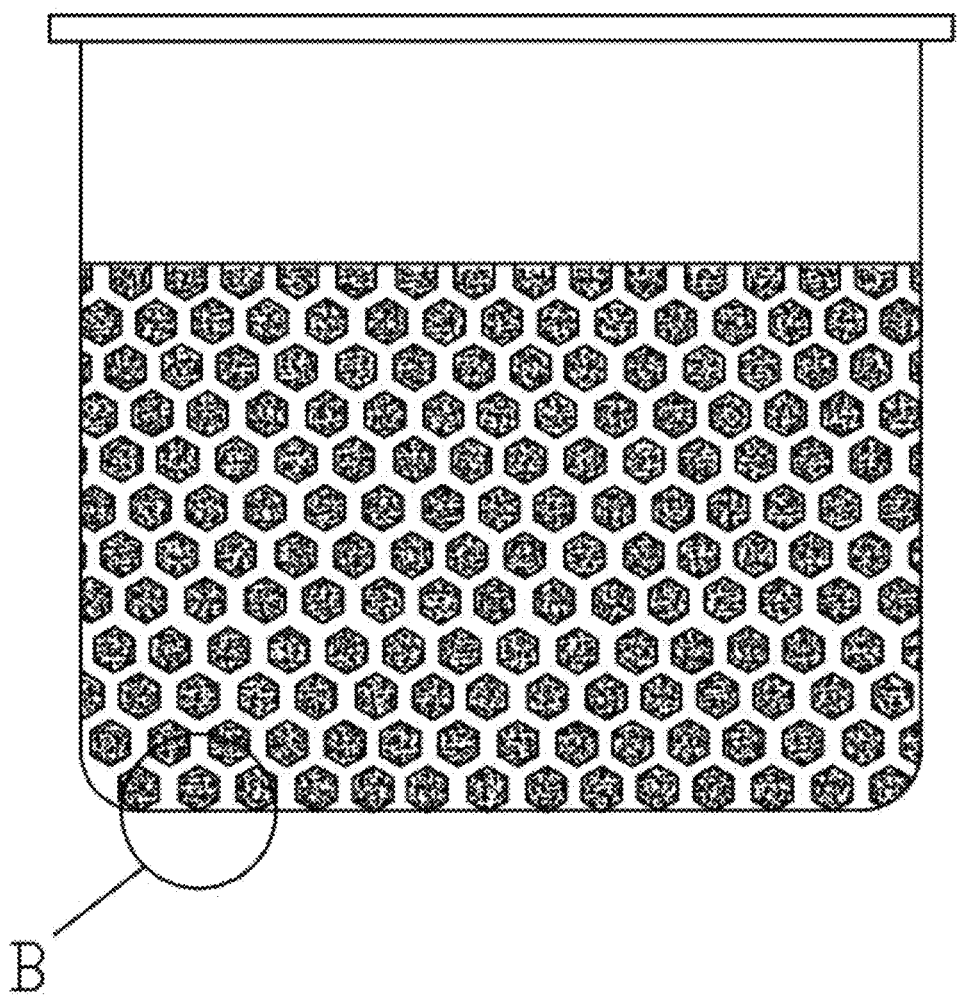
FIG. 1 is a schematic view of a soup pot according to an embodiment of the present invention.
Figure 2:
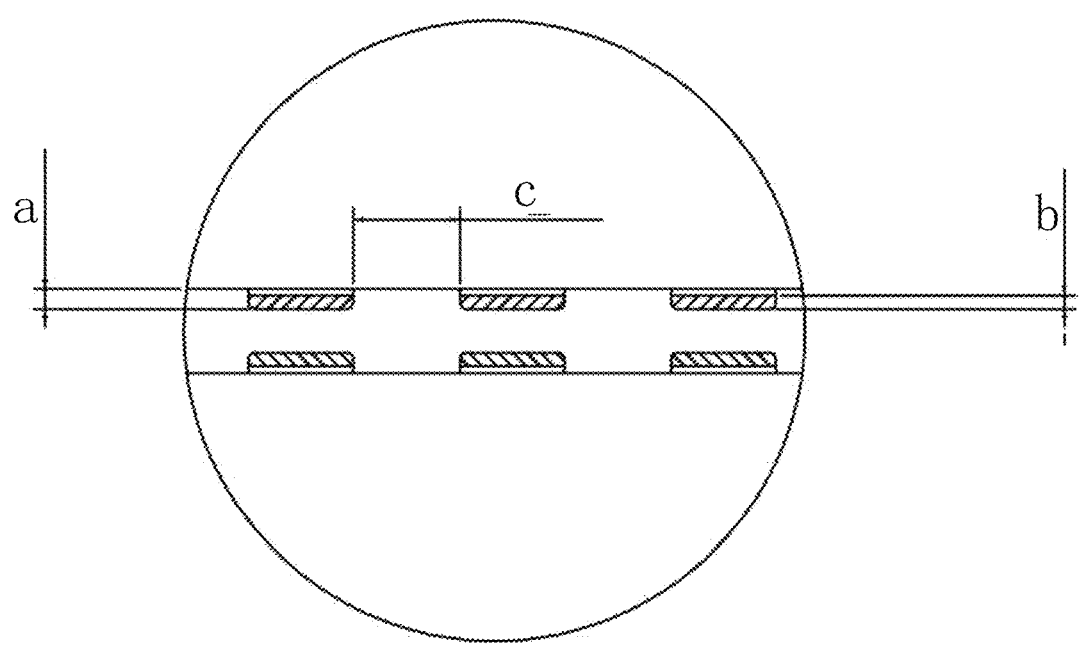
FIG. 2 is an enlarged sectional view at area B in FIG. 1.

With reference to FIGS. 1 and 2, an etching depth a in step S4 ranges from 0.1 mm to 0.3 mm.

A thickness b of the non-stick pan coating sprayed in step S6 is less than 0.1 mm.

A space of the convex patterns in step S6 is within 1 mm.

In the embodiments of the present invention, the pot body at the positions where no patterns occur is also etched to ensure a uniform overall thickness of the plane blank of the pot body, so as to prevent the spot body from fractures at the border between the positions where the concave-convex patterns occur and the positions where no concave-convex pattern occurs, when the plane blank of the pot body is deeply stamped and stretched, ensuring a yield of products. Therefore, a finished product according the invention can have a surface with a concave-convex patterned lower part and a polished smooth upper part, to provide a better decorative effect.

The above description of the disclosed embodiments enables those skilled in the art to achieve or use the present invention. Various modifications made to these embodiments are apparent to those skilled in the art, and the general principles defined herein may be implemented in other embodiments without departing from the spirit or scope of the present invention. Therefore, the present invention will not be limited to these embodiments herein, but shall conform to the widest scope consistent with the principles and novel features disclosed herein.

The invention claimed is:

1. A manufacturing method for a soup pot with partial concave-convex patterns on an outer surface thereof, comprising:
   step S1: making a plane blank for forming a pot body;
   step S2: screen-printing a layer of ink with preset patterns on a top surface of the plane blank of the pot body, and drying and curing the ink;
   step S3: screen-printing a layer of ink with preset patterns on a bottom surface of the plane blank of the pot body, wherein at positions where no pattern occurs the bottom surface is not covered, and then drying and curing the ink;
   step S4: etching at positions where no patterns occur on the top surface and the bottom surface of the plane blank of the pot body, and then cleaning the ink and drying;
   step S5: stretching the plane blank of the pot body to form a soup pot, and flashing an edge of the pot body; and
   step S6: spraying a nonstick pan coating on the top surface of the plane blank of the pot body, and polishing with abrasive paper at positions where convex patterns occur and where no pattern occurs, wherein the convex patterns are formed by the etching on the top surface the plane blank, so that, only at positions where concave patterns occur does the nonstick pan coating remain.

2. The manufacturing method according to claim 1, wherein in step S2 the preset patterns described are polygonal patterns evenly distributed in matrixes.

3. The manufacturing method according to claim 1, wherein in step S4 an etching depth ranges from 0.1 mm to 0.3 mm.

4. The manufacturing method to claim 1, wherein in step S6 a thickness of the non-stick pan coating sprayed is less than 0.1 mm.

5. The manufacturing method according to claim 1, wherein in step S6 a space of the convex patterns is within 1 mm.

* * * * *